United States Patent
Chen et al.

(10) Patent No.: US 8,054,661 B2
(45) Date of Patent: Nov. 8, 2011

(54) AC ADAPTER AND THE CONTROL METHOD THEREOF

(75) Inventors: Ming-Yu Chen, Taoyuan (TW); Fu-Chiang Chou, Taoyuan (TW)

(73) Assignee: HTC Corporation, Taoyuan City, Taoyuan County (TW)

( * ) Notice: Subject to any disclaimer, the term of this patent is extended or adjusted under 35 U.S.C. 154(b) by 240 days.

(21) Appl. No.: 12/619,854

(22) Filed: Nov. 17, 2009

(65) Prior Publication Data
US 2010/0172164 A1    Jul. 8, 2010

(30) Foreign Application Priority Data
Jan. 6, 2009  (TW) ................................. 98100234 A

(51) Int. Cl.
*H02M 1/20* (2006.01)
*H01H 47/22* (2006.01)
(52) U.S. Cl. ........................................ 363/146; 361/170
(58) Field of Classification Search .................. 363/126, 363/146; 361/139, 160, 170, 179, 187
See application file for complete search history.

(56) References Cited

U.S. PATENT DOCUMENTS

| 6,272,030 B1 * | 8/2001 | Oomura ........................... 363/62 |
| 6,754,092 B2 * | 6/2004 | McDowell et al. .............. 363/89 |
| 7,656,641 B2 * | 2/2010 | Mason et al. ................... 361/160 |
| 7,782,642 B2 * | 8/2010 | Unger et al. .................... 363/146 |
| 7,960,648 B2 * | 6/2011 | McGinley et al. ............... 174/36 |
| 2010/0284206 A1 * | 11/2010 | Tai et al. ........................ 363/126 |

* cited by examiner

*Primary Examiner* — Gary L Laxton
(74) *Attorney, Agent, or Firm* — Thomas, Kayden, Horstemeyer & Risley, LLP

(57) ABSTRACT

An AC adapter including an AC-side plug module and a DC-side connector module coupled to each other is provided. A first voltage-reducing element and a relay are electrically coupled to an AC power supply. An AC-to-DC converter is electrically coupled to the relay. The DC-side connector module has a mechanical switch element electrically coupled to the relay and the first voltage-reducing element. When the DC-side connector module is connected to a device socket, the mechanical switch element is turned on and the relay is enabled, so that the electrical power of the AC power supply is transmitted to the AC-to-DC converter through the enabled relay. When the DC-side connector module is disconnected from the device socket, the mechanical switch element is turned off and the relay is disabled, so that the electrical power of the AC power supply is not transmitted to the AC-to-DC converter.

20 Claims, 2 Drawing Sheets

AC ADAPTER AND THE CONTROL METHOD THEREOF

This application claims the benefit of Taiwan application Series No. 98100234, filed Jan. 6, 2009, the subject matter of which is incorporated herein by reference.

TECHNICAL FIELD

The application relates in general to an AC adapter and a control method thereof, and more particularly to an AC adapter and a control method thereof for saving power.

BACKGROUND

At present, most electronic devices use an AC adapter to provide necessary power or to charge electronic devices. After the AC adapter is plugged into the wall-outlet in a household or office, the AC adapter converts AC power to DC power, which electronic products can make use of.

For ordinary portable electronic devices, such as a mobile phone or personal digital assistant (PDA), which are normally powered by a battery, the AC adapter is used in certain condition. As the outlet may be located at a position on the wall not convenient for the user to plug, after the user finishes charging the portable electronic device, the user normally removes the portable electronic device from the AC adapter instead of removing the AC adapter from the wall-wallet.

However, the AC adapter left plugged in the wall-outlet still consumes power and results in power waste despite the AC adapter is no more charging the portable electronic device. According to a practical experiment for the measurement of the AC adapter of a mobile phone, there are a current of 1.5 milli-amperes flowing through the AC adapter when the AC adapter of the mobile phone is at full capacity. After the mobile is unplugged, there are still a current of 0.93 milli-amperes, which are about 60% of the one at full capacity, flowing through the AC adapter. Nowadays, environmental conservation and power saving are highly valued. Thus, it is an important subject in the industry to develop an AC adapter which reduces the power consumption when being plugged in a wall-outlet.

SUMMARY OF THE APPLICATION

The application is directed to an AC adapter and a control method thereof for reducing power consumption of the AC adapter when the AC adapter plugged in a wall-outlet is not in use so as to save power and be environmentally friendly.

According to a first aspect of the present application, an AC adapter including an AC-side plug module and a DC-side connector module is provided. The AC-side plug module includes a first voltage-reducing element, a relay and an AC-to-DC converter. The first voltage-reducing element is electrically coupled to an AC power supply. The relay is electrically coupled to the AC power supply. The AC-to-DC converter is electrically coupled to the relay. The DC-side connector module is coupled with the AC-side plug module. The DC-side connector module has a mechanical switch element, which is electrically coupled to the relay and the first voltage-reducing element. When the DC-side connector module is connected to a device socket, the mechanical switch element is turned on and the relay is enabled, so that the electrical power of the AC power supply is transmitted to the AC-to-DC converter through the enabled relay, and the AC-to-DC converter correspondingly generates a DC voltage. When the DC-side connector module is not connected to the device socket, the mechanical switch element is turned off and the relay is disabled, so that the electrical power of the AC power supply is not transmitted to the AC-to-DC converter.

According to a second aspect of the present application, a control method of an AC adapter is provided. The method includes the following steps. Firstly, an AC adapter having an AC-side plug module and a DC-side connector module is provided. The AC-side plug module has a first voltage-reducing element, a relay, and an AC-to-DC converter. The first voltage-reducing element is electrically coupled to the AC power supply; the relay is electrically coupled to the AC power supply; and the AC-to-DC converter is electrically coupled to the relay. The DC-side connector module is coupled with the AC-side plug module. The DC-side connector module has a mechanical switch element, which is electrically coupled to the relay and the first voltage-reducing element. When the DC-side connector module is connected to the device socket, the mechanical switch element is turned on so that the relay is enabled. Meanwhile, the electrical power of the AC power supply is transmitted to the AC-to-DC converter through the enabled relay, so that the AC-to-DC converter correspondingly generates a DC voltage. When the DC-side connector module is not connected to the device socket, the mechanical switch element is turned off so that the relay is disabled. Meanwhile, the electrical power of the AC power supply is not transmitted to the AC-to-DC converter.

The application will become more apparent from the following detailed description of the preferred but non-limiting embodiments. The following description is made with reference to the accompanying drawings.

DETAILED DESCRIPTION OF THE APPLICATION

The application provides an AC adapter including an AC-side plug module and a DC-side connector module. The AC-side plug module includes a first voltage-reducing element, a relay and an AC-to-DC converter. The first voltage-reducing element is electrically coupled to an AC power supply. The relay is electrically coupled to the AC power supply. The AC-to-DC converter is electrically coupled to the relay. The DC-side connector module is coupled with the AC-side plug module. The DC-side connector module has a mechanical switch element, which is electrically coupled to the relay and the first voltage-reducing element. When the DC-side connector module is connected to a device socket, the mechanical switch element is turned on and the relay is enabled, so that the electrical power of the AC power supply is transmitted to the AC-to-DC converter through the enabled relay, and the AC-to-DC converter correspondingly generates a DC voltage. When the DC-side connector module is not connected to the device socket, the mechanical switch element is turned off and the relay is disabled, so that the electrical power of the AC power supply is not transmitted to the AC-to-DC converter. An embodiment is exemplified below.

Figure 1:
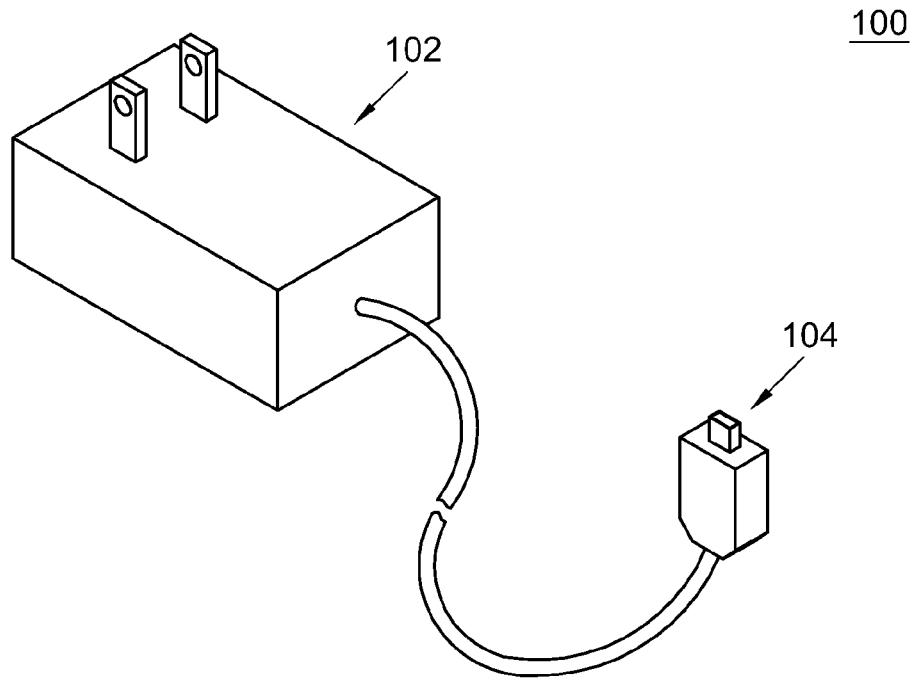
FIG. 1 shows a structural diagram of an AC adapter of an embodiment of the application.

Referring to FIG. 1, a structural diagram of an AC adapter of an embodiment of the application is shown. As indicated in FIG. 1, the AC adapter 100 includes an AC-side plug module 102 and a DC-side connector module 104. The DC-side connector module 104 is coupled with the AC-side plug module 102. The AC-side plug module 102 is connected to a power outlet (not illustrated in FIG. 1) so as to be electrically connected to an AC power supply. The AC power supply is, for example, a power grid, and the power outlet is, for example, a wall-outlet in a building. The DC-side connector module 104 is electrically connected to the device socket (not illustrated in FIG. 1) of an electronic device, and is for outputting the DC voltage converted from the AC voltage by the AC adapter 100 to the electronic device.

Figure 2:
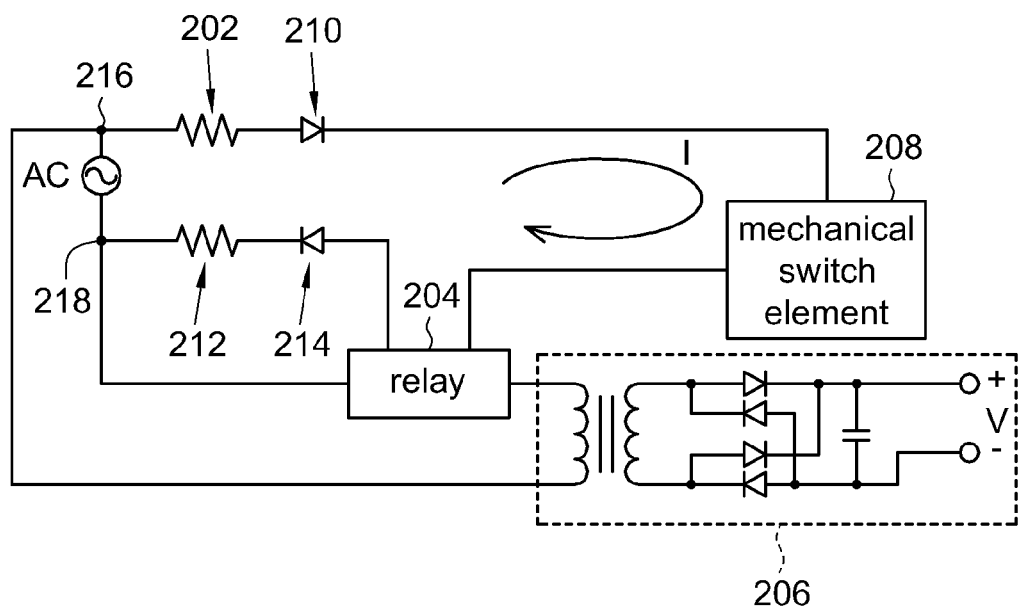
FIG. 2 shows a circuit diagram of the AC adapter of FIG. 1.

Referring to FIG. 2, a circuit diagram of the AC adapter of FIG. 1 is shown. The AC-side plug module 102 has a first voltage-reducing element 202, a relay 204 and an AC-to-DC converter 206. The first voltage-reducing element 202 is electrically coupled to the AC power supply AC. The relay 204 is electrically coupled to the AC power supply AC. The AC-to-DC converter 206 is electrically coupled to the relay 204. The DC-side connector module 104 has a mechanical switch element 208 which is electrically coupled to the relay 204 and the first voltage-reducing element 202.

When the DC-side connector module 104 is connected to the device socket of the electronic device, the mechanical switch element 208 is turned on and the relay 204 is enabled. In this situation, the electrical power of the AC power supply AC is transmitted to the AC-to-DC converter 206 through the enabled relay 204, so that the AC-to-DC converter 206 correspondingly generates a DC voltage V. When the DC-side connector module 104 is not connected to the device socket of the electronic device, the mechanical switch element 208 is turned off and the relay 204 is disabled. In this situation, the electrical power of the AC power supply AC is not transmitted to the AC-to-DC converter 206, so that the AC-to-DC converter 206 does not function or generate a DC voltage V.

Because the mechanical switch element 208 is disposed on the DC-side connector module 104, when the user no more uses the AC adapter 100 and unplugs the DC-side connector module 104 from the device socket of the electronic device, the mechanical switch element 208 is turned off. As the mechanical switch element 208 is turned off, even if the AC-side plug module 102 is still plugged in the power outlet and electrically connected to the AC power supply, there is no electrical current flowing through the relay 204 and the relay 204 is disabled. The disabled relay 204 blocks the transmission of the AC power supply AC, so that the electrical power of the AC power supply AC is not transmitted to the AC-to-DC converter 206, and the AC-to-DC converter 206 does not function. Therefore, the AC adapter 100 avoids a large amount of power dissipation.

In addition, through the use of the first voltage-reducing element 202, the magnitude of the current flowing through the mechanical switch element 208 is restricted. Although the AC power supply AC is a high voltage power source, the first voltage-reducing element 202 can step down the cross voltage between the mechanical switch element 208 and the relay 204, causing the current flowing through the mechanical switch element 208 and the relay 204 to become a small current. Thus, when the user touches the mechanical switch element 208 incidentally, the user will not be injured from electrical shock.

Moreover, through the use of the relay 204, the transmission of the large current of the AC power supply AC is controlled by the small current. Furthermore, the mechanical switch element 208 of the present embodiment of the application can be a mechanical switch element with a small current capability, so that the AC adapter 100 of the present embodiment of the application further provides the advantage of low cost.

Preferably, the first voltage-reducing element 202 and the mechanical switch element 208 are connected in series. When the mechanical switch element 208 is enabled, a current, which comes from the AC power supply AC and flows through the first voltage-reducing element 202 as well as the mechanical switch element 208, enables the relay 204.

Furthermore, the AC-side plug module 102 further includes a first rectifier 210, a second voltage-reducing element 212, and a second rectifier 214. The first rectifier 210 and the first voltage-reducing element 202 are connected in series. The second rectifier 214 and the second voltage-reducing element 212 are connected in series. The first voltage-reducing element 202 is electrically coupled to a first end 216 of the AC power supply AC. The second voltage-reducing element 212 is electrically coupled to a second end 218 of the AC power supply AC. In the present embodiment of the application, the first rectifier 210 and the second rectifier 214 are, for example, implemented by diodes, and the first voltage-reducing element 202 and the second voltage-reducing element 212 are, for example, implemented by resistors.

Thus, when the mechanical switch element 208 is enabled, a current I, which comes from the AC power supply AC and flows through the first voltage-reducing element 202, the first rectifier 210, the mechanical switch element 208, the second rectifier 214, and the second voltage-reducing element 212, enables the relay 204. The relay 204 can be implemented by a magnetic-valve relay or a photo-coupled relay. However, the present embodiment of the application is not limited thereto.

The AC-to-DC converter 206 can be implemented by a modulator, a number of diodes and capacitors. The AC voltage received by the AC-to-DC converter 206 is converted by the modulator and rectified by the diodes, and then a DC voltage V is generated by the capacitor functioning as a filter circuit. However, the AC-to-DC converter 206 of FIG. 2 is only provided as an example, and any converters capable of converting alternating current to direct current can also be used in the present embodiment of the application.

According to a conventional method, when the AC adapter is not connected to an electronic device, the primary side of the modulator of the AC-to-DC converter still receives an AC voltage, so that the modulator still generates magnetic flux and consumes power. In the present embodiment of the application, when the DC-side connector module is not connected to the device socket of the electronic device, the relay 204 is disabled. The primary side of the modulator of the AC-to-DC converter 206 does not receive the AC voltage, and no magnetic flux is generated in substantial. In this way, the power consumption of the AC-to-DC converter 206 is effectively reduced, thereby saving power when the AC adapter 100 is not in use.

Figure 3:
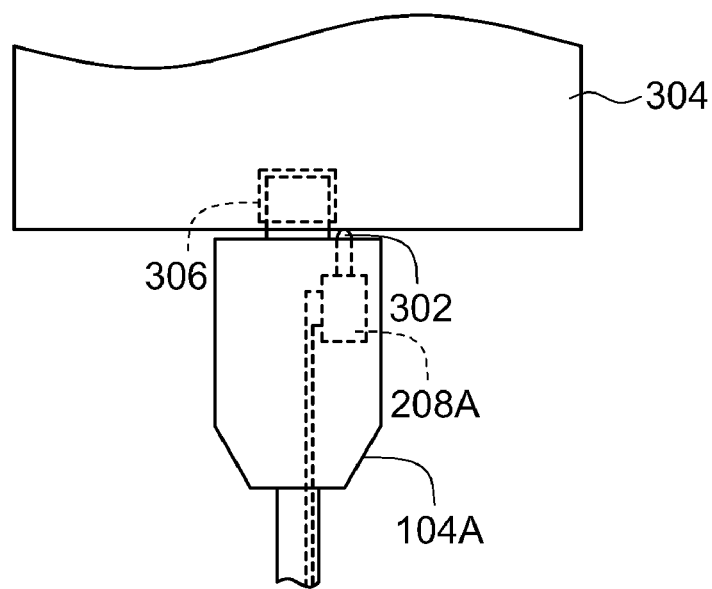
FIG. 3 shows an example of the mechanical switch element of FIG. 2.

Referring to FIG. 3, an example of the mechanical switch element of FIG. 2 is shown. The mechanical switch element 208 of FIG. 2 is implemented by a mechanical switch element 208A. The mechanical switch element 208A has a touch key 302. The touch key 302 can be pressed and is disposed on a surface of the DC-side connector module 104A which is opposite to the device socket 306 of the electronic device 304 and by touching. When the DC-side connector module 104A is connected to the device socket 306 of the electronic device 304, the touch key 302 is pressed by the bottom surface of the electronic device 304, so that the mechanical switch element 208A is turned on. When the DC-side connector module 104A is disconnected from the device socket 306 of the electronic device 304, the touch key 302 is not pressed and the mechanical switch element 208A is turned off.

Figure 4:
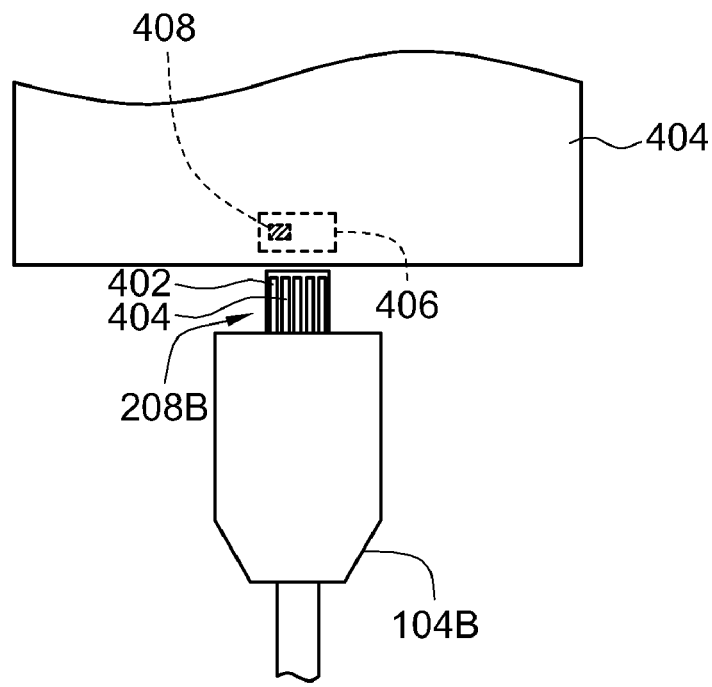
FIG. 4 shows another example of the mechanical switch element of FIG. 2.

Referring to FIG. 4, another example of the mechanical switch element of FIG. 2 is shown. The mechanical switch element 208 of FIG. 2 can also be implemented by a mechanical switch element 208B. The mechanical switch element 208B has a first pin 402 and a second pin 404. The device socket 406 of the electronic device 404 has a conductive piece 408. When the DC-side connector module 104B is connected to the device socket 406, the first pin 402 and the second pin 404 are electrically connected to the conductive piece 408, so that the first pin 402 and the second pin 404 are in a short-circuit condition, causing the mechanical switch element 208B to be turned on. When the DC-side connector module 104B is disconnected from the device socket 406 of the electronic device 404, the first pin 402 and the second pin 404 are in an open circuit condition. The mechanical switch element 208B is turned off. Preferably, the conductive piece 408 is disposed on an inner wall of the device socket 406, and is opposite to the first pin 402 and the second pin 404.

The mechanical switch elements 208A and 208B of FIG. 3 and FIG. 4 are provided as examples for practicing the mechanical switch element 208, and the application is not limited thereto. Any mechanical switch elements can be applied in the present embodiment of the application as long as it is capable of turning on the mechanical switch element when the DC-side connector module is connected to the device socket, and turning off the mechanical switch element when the DC-side connector module is not connected to the device socket.

The AC adapter 100 of the present embodiment of the application further has the advantage of convenient operation. When the user unplugs the DC-side connector module from the device socket, the mechanical switch element 208 is automatically activated and turned off, hence saving power. As the user does not have to manually activate any other switch to save power, the AC adapter 100 of the present embodiment of the application is indeed very convenient to the user.

The AC adapter of the application and the control method thereof reduce the power dissipation for the AC adapter plugged in a wall-outlet when the electronic device is not in use, hence providing the advantages of saving power and being environmentally friendly. Also, the AC adapter of the application is convenient to the user.

While the application has been described by way of example and in terms of a preferred embodiment, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An AC adapter, comprising:
    an AC-side plug module, comprising:
        a first voltage-reducing element electrically coupled to an AC power supply;
        a relay electrically coupled to the AC power supply; and
        an AC-to-DC converter electrically coupled to the relay;
    a DC-side connector module coupled with the AC-side plug module, wherein the DC-side connector module has a mechanical switch element which is electrically coupled to the relay and the first voltage-reducing element;
    wherein when the DC-side connector module is connected to a device socket, the mechanical switch element is turned on and the relay is enabled, so that the electrical power of the AC power supply is transmitted to the AC-to-DC converter through the enabled relay, and the AC-to-DC converter correspondingly generates a DC voltage;
    wherein when the DC-side connector module is not connected to the device socket, the mechanical switch element is turned off and the relay is disabled, so that the electrical power of the AC power supply is not transmitted to the AC-to-DC converter.

2. The AC adapter according to claim 1, wherein the first voltage-reducing element and the mechanical switch element are connected in series, and when the mechanical switch element is enabled, a current, which comes from the AC power supply and flows through the first voltage-reducing element as well as the mechanical switch element, enables the relay.

3. The AC adapter according to claim 1, wherein the AC-side plug module further comprises a first rectifier, and the first rectifier is connected to the first voltage-reducing element in series.

4. The AC adapter according to claim 3, wherein the first rectifier is a diode, and the first voltage-reducing element is a resistor.

5. The AC adapter according to claim 1, wherein the AC-side plug module further comprises a second voltage-reducing element; the first voltage-reducing element is electrically coupled to a first end of the AC power supply, and the second voltage-reducing element is electrically coupled to a second end of the AC power supply; and when the mechanical switch element is enabled, the current, which comes from the AC power supply and flows through the first voltage-reducing element, the mechanical switch element, and the second voltage-reducing element, enables the relay.

6. The AC adapter according to claim 5, wherein the AC-side plug module further comprises a second rectifier, and the second rectifier is connected to the second voltage-reducing element in series.

7. The AC adapter according to claim 1, wherein the mechanical switch element has a touch key, and when the DC-side connector module is connected to the device socket, the touch key is pressed, so that the mechanical switch element is turned on.

8. The AC adapter according to claim 1, wherein the mechanical switch element has a first pin and a second pin, and the device socket has a conductive piece; and when the DC-side connector module is connected to the device socket, the first pin and the second pin are electrically connected to the conductive piece, so that the mechanical switch element is turned on.

9. The AC adapter according to claim 1, wherein the relay is a magnetic-valve relay.

10. The AC adapter according to claim 1, wherein the relay is a photo-coupled relay.

11. A control method of an AC adapter, comprising:
    providing the AC adapter, the AC adapter having an AC-side plug module and a DC-side connector module, wherein the AC-side plug module has a first voltage-reducing element, a relay, and an AC-to-DC converter; the first voltage-reducing element is electrically coupled to an AC power supply; the relay is electrically coupled to the AC power supply; the AC-to-DC converter is electrically coupled to the relay; the DC-side connector module is coupled with the AC-side plug module; the DC-side connector module has a mechanical switch element, and the mechanical switch element is electrically coupled to the relay and the first voltage-reducing element;

when the DC-side connector module is connected to a device socket, the mechanical switch element is turned on and the relay is enabled, so that the electrical power of the AC power supply is transmitted to the AC-to-DC converter through the enabled relay, and the AC-to-DC converter correspondingly generates a DC voltage; and when the DC-side connector module is not connected to the device socket, the mechanical switch element is turned off and the relay is disabled, so that the electrical power of the AC power supply is not transmitted to the AC-to-DC converter.

12. The method according to claim 11, wherein the first voltage-reducing element and the mechanical switch element are connected in series, and when the mechanical switch element is enabled, the current, which comes from the AC power supply and flows through the first voltage-reducing element as well as the mechanical switch element, enables the relay.

13. The method according to claim 11, wherein the AC-side plug module further comprises a first rectifier, and the first rectifier is connected to the first voltage-reducing element in series.

14. The method according to claim 13, wherein the first rectifier is a diode, and the first voltage-reducing element is a resistor.

15. The method according to claim 11, wherein the AC-side plug module further comprises a second voltage-reducing element; the first voltage-reducing element is electrically coupled to a first end of the AC power supply, and the second voltage-reducing element is electrically coupled to a second end of the AC power supply; and when the mechanical switch element is enabled, the current, which comes from the AC power supply and flows through the first voltage-reducing element, the mechanical switch element, and the second voltage-reducing element, enables the relay.

16. The method according to claim 15, wherein the AC-side plug module further comprises a second rectifier, and the second rectifier is connected to the second voltage-reducing element in series.

17. The method according to claim 11, wherein the mechanical switch element has a touch key; and when the DC-side connector module is connected to the device socket, the touch key is pressed, so that the mechanical switch element is turned on.

18. The method according to claim 11, wherein the mechanical switch element has a first pin and a second pin, and the device socket has a conductive piece; and when the DC-side connector module is connected to the device socket, the first pin and the second pin are electrically connected to the conductive piece, so that the mechanical switch element is turned on.

19. The method according to claim 11, wherein the relay is a magnetic-valve relay.

20. The method according to claim 11, wherein the relay is a photo-coupled relay.

* * * * *